United States Patent [19]

Muir

[11] Patent Number: 4,847,302

[45] Date of Patent: Jul. 11, 1989

[54] USE OF CERTAIN COMPOUNDS IN LIVESTOCK FOOD AS GROWTH PROMOTANTS FOR BETTER FEED UTILIZATION AND IMPROVED CARCASS COMPOSITION

[75] Inventor: Larry A. Muir, Flemington, N.J.

[73] Assignee: Merck & Co., Inc., Rahway, N.J.

[21] Appl. No.: 177,210

[22] Filed: Apr. 4, 1988

Related U.S. Application Data

[60] Division of Ser. No. 731,255, May 8, 1985, abandoned, which is a continuation-in-part of Ser. No. 617,299, Jun. 4, 1984, abandoned.

[51] Int. Cl.$^4$ ............................................ A61K 31/135
[52] U.S. Cl. ..................................................... 514/657
[58] Field of Search ........................................... 514/657

[56] References Cited

U.S. PATENT DOCUMENTS

4,153,677  5/1979  John ........................................ 424/35
4,358,455 11/1982  Atkinson et al. ..................... 424/263

OTHER PUBLICATIONS

Baker et al., Fed. Proc. 43, No. 3, p. 668 and No. 4, p. 816.

*Primary Examiner*—Frederick E. Waddell
*Attorney, Agent, or Firm*—David L. Rose; Michael C. Sudol

[57] ABSTRACT

A method is described in which the feed utilization by livestock is improved by the incorporation in the feed or drinking water of the said livestock of certain compounds, with resultant increase in body weight, decrease in body fat and increase in body protein for the same food intake.

2 Claims, No Drawings

USE OF CERTAIN COMPOUNDS IN LIVESTOCK FOOD AS GROWTH PROMOTANTS FOR BETTER FEED UTILIZATION AND IMPROVED CARCASS COMPOSITION

CROSS-REFERENCE TO RELATED APPLICATIONS

This application is a divisional of Ser. No. 731,255, filed May 8, 1985, now abandoned, which is a continuation-in-part of Ser. No. 617,299, filed June 4, 1984, now abandoned.

SUMMARY OF THE INVENTION

This invention relates to a method of improving feed utilization and carcass composition by livestock which comprises the incorporation in the food or drinking water furnished to said livestock of from 0.01 to 100 parts per million of at least one compound selected from the group described in Table A. More specifically, it comprises a method of improving feed utilization and carcass composition in which the compounds of structures I, IV and IX are used. More specifically also, it relates to animal feed compositions for administration to livestock which comprises from 0.01 to 100 parts per million of a compound listed in Table A especially compounds I, IV and IX. The invention also relates to ruminants as slow release rumen boluses releasing doses of from 0.1 to 100 mg per head per day of at least one compound selected from the group listed in Table A especially compounds I, IV and IX. The invention also relates to all livestock as systemic implants that provide doses of 0.001 to 10 mg per head per day.

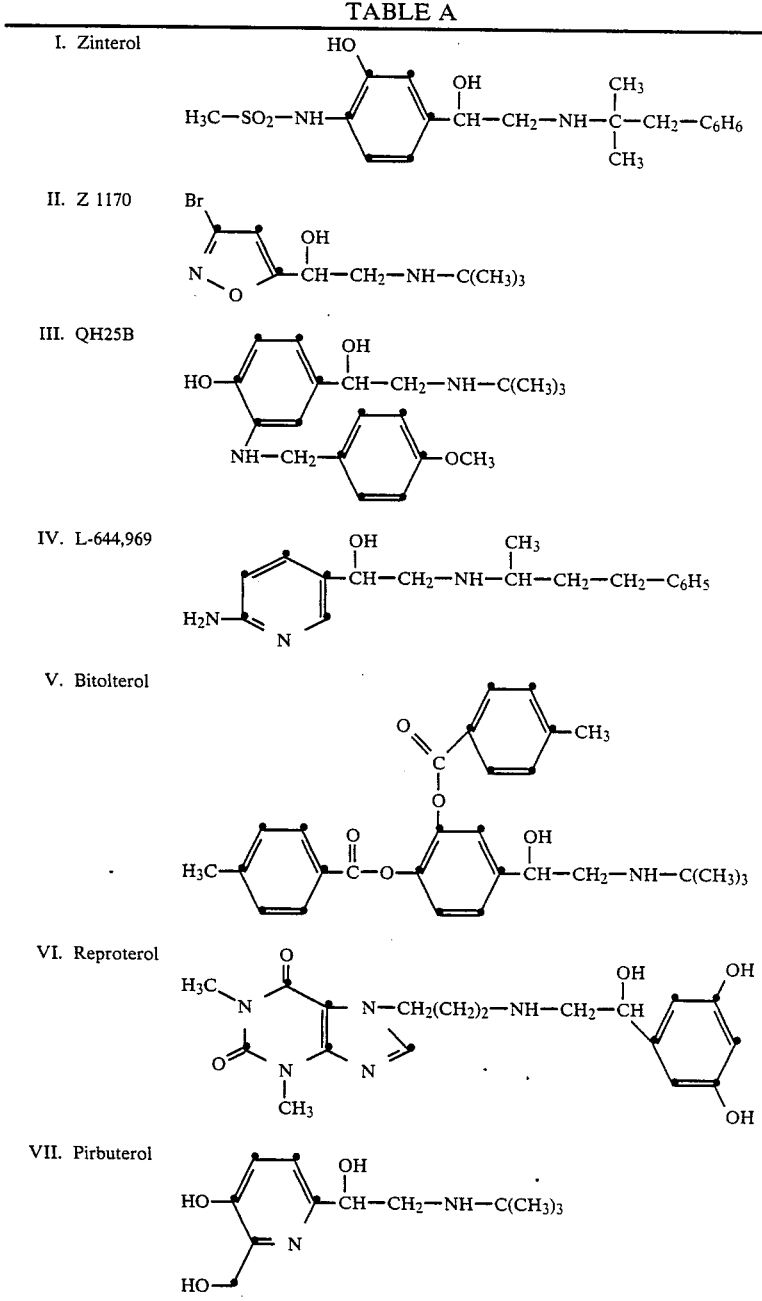

TABLE A

TABLE A-continued

VIII. AA497

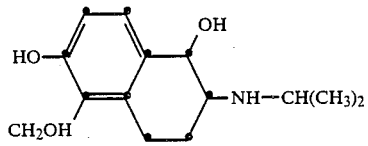

IX. Formoterol

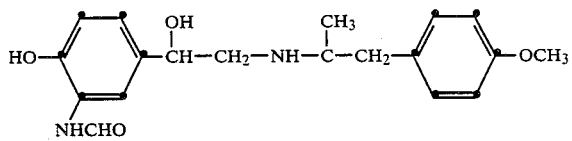

X. Colterol

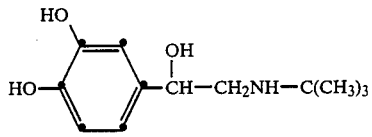

Compound X, Colterol, while similar to the other compounds in its growth promoting activity, differs in that very little activity is found when administered orally. It is however substantially active when administered parenterally.

It will be appreciated by those skilled in the art that the above compounds have one or more asymmetric centers and may exist as separable optical isomers or as equal mixtures of optical isomers which would be optically inactive racemic mixtures. The foregoing structures are presented in planar form, however, all possible optical isomers contained therein are intended to be included within the ambit of this invention.

One skilled in the art will also realize that separated optical isomers may often have different activities, one from the other, and such differences are also to be considered within the instant invention.

As an example of this, it is noted that compound IV has two centers of asymmetry, the first (referred to as "α") and third (referred to as "1") carbon atoms to the right of the pyridine ring carrying a hydroxy and a methyl substituent respectively. This will give rise to four possible optical isomers when the hydroxy and methyl are individually either above ($\beta$) or below ($\alpha$) the plane of the molecule. In particular the isomer wherein both the hydroxy and methyl are $\beta$ (which is more exactly referred to as the α-R,1R compound) has been found to be significantly more active than the most active of the other isomers.

BACKGROUND OF THE INVENTION

There is a need in animal husbandry for methods of improving the utilization of food. It is important not only that the growth of the animals be promoted but that the utilization of the food be directed in a different way, namely, to produce less fat and more protein. Some compounds have been described which enhance the utilization of food and change the carcass composition in some species of food livestock. Baker et al. have described (*Fed. Proc.* 42 No. 4. p. 816, No. 3 p. 668) that a compound called clenbuterol functions in this way. However, while this may be the best such agent published in the scientific literature, clenbuterol is not as active as other compounds in poultry, sheep or swine, especially compared to the compounds used in this invention.

DESCRIPTION OF THE INVENTION

We have found that the compounds listed in Table A are highly active in promoting the utilization of food by livestock intended for human consumption. They provide more growth and better utilization of the feed producing more protein and less fat. As can be seen in Table A the compounds involved differ widely in chemical structure. They also differ drastically from clenbuterol. While some of the active compounds listed in Table A are reported to have $\beta$-adrenergic activity, many compounds reported to be $\beta$-adrenergic agonists have very little or no growth promoting activity. Thus, accurate prediction of growth promoting activity on the basis of chemical structure or $\beta$-adrenergic activity is not possible.

Of a special use in this invention are the three compounds listed in Table A as I, IV, V and IX. All of these share high activity in all species under consideration. However, all of these compounds of Table A enhance the food utilization in some species by promoting growth and providing more protein and less fat for the same food intake. In particular, the high level of activity of Compound V, bitolterol, combined with its very low level of toxicity, makes it a highly preferred growth promotant agent.

EXAMPLE 1

In Vitro Testing

Adipose tissue collection and preparation

Fat was collected from freshly killed animals as follows: epididymal and perirenal fat from 150 to 200 g male rates; perirenal fat from 20 to 25 kg whether lambs, and perirenal and omental fat from 35 to 50 kg gilts. Immediately after collection, fat was placed in a siliconized beaker (all glassware was siliconized) containing Krebs-Ringer bicarbonate solution (KRB; pH 7.4) at 37° C. Fat was transferred to a clean beaker and finely chopped with scissors. Chopped fat was then used as such (whole adipose preparation) or treated with collagenase (isolated adipocytes).

Isolation of adipocytes

Chopped fat was placed in a shaker containing 70 ml cell dispersion medium (CDM; 5 mM glucose, 0.1% collagenase, 4% bovine serum albumin (BSA), in KRB)

and incubated at 37° C. for 1 hour with gentle shaking. Fat was then filtered to remove clumps and washed 4 times with washing medium (WM; 2.5 mM glucose, 1% BSA, in KRB) and 1 time with final suspension medium (FSM; 2.5 mM glucose, 2% essentially fatty acid free BSA, in KRB). Isolated adipocytes were then resuspended in the required amount of FSM (1 ml/flask, 3 flasks/treatment).

Determination of lipolytic activity in adipose tissue or adipocytes

Whole adipose tissue from the rat (0.3 ml) or isolated adipocytes from sheep or swine (1 ml) were placed in plastic scintillation vials containing FSM (1.7 or 1 ml, respectively) and test compounds, and incubated at 37° C. for 2 hours. Compounds were tested at concentrations of 0.01, 0.05, 0.25 and 1.25 μM. Isoproterenol, at the same concentrations, was used as a positive control. After incubation, media was removed and assayed for glycerol by a fluorometric modification of the method of Wieland (1974. Glycerol UV-method. pp. 1404. In: Bergmeyer (Ed.) Methods of Enzymatic Analysis. Verlag Chemie Weinham, Academic Press, New York).

Determination of anti-lipogenic activity in hepatocytes

Hepatocytes were isolated from chicken liver using the procedure for adipocytes and incubated for 2 hours at 37° C. in the presence of $^{14}C$ acetate and test compounds. Compounds were tested at concentrations of 0.01, 0.05, 0.25 and 1.25 μM. Isoproterenol, at the same concentrations, was used as a positive control. After incubation, 8 ml Doles reagent (isopropanol:hexane:H$_2$SO$_4$, 40:10:1) was added and incubation vials were shaken at room temperature for 30 minutes. Vial contents were poured into 50 ml screw-cap tubes. Vials were then rinsed with 6 ml hexane which was poured into the appropriate 50 ml tube. Tubes were shaken by hand, 10 ml H$_2$O was added, and tubes were shaken again. After phase separation, 2 ml of the upper (hexane) phase was removed to scintillation vials. Hexane was evaporated by a gentle air flow and the remaining lipids were resuspended in 10 ml Scinti Verse II. $^{14}C$ was counted in a Packard liquid scintillation counter. Data are reported as CPM of $^{14}C$ acetate incorporated into total lipids.

Results of in vitro testing

All nine compounds listed in Table A had significant antilipogenic activity. The three compounds identified as I, IV and IX appear to have five times the antilipogenic activity of isoproterenol and greater than 125 times the antilipogenic activity of clenbuterol in chicken hepatocytes. The nine compounds were tested for lipolytic activity in isolated swine (Table C) and ovine (Table D) adipocytes. All nine compounds significantly stimulated lipolysis in isolated swine or ovine adipocytes. Eight of the nine compounds were significantly more active than clenbuterol in stimulating lipolysis in isolated adipocytes. The lack of activity of clenbuterol in swine adipocytes should especially be noted.

The compounds were also tested (Table E) for lipolytic activity using chopped adipose tissue from rats and all nine compounds were found to be active. While rats are not a target species for the product, they are a good model for testing in vivo.

EXAMPLE 2

In Vivo Testing

Eighty intact, male Charles River CD rats, 75–90 g, were housed and maintained on rat chow and water ad libitum. After four days acclimation ten rats per group were randomized by weight to treatment and pen. Compounds to be tested were premixed and added to ground rat chow using doses equivalent to 20 ppm of clenbuterol on a molecular weight basis. It had previously been determined 10 ppm of clenbuterol was the minimum dose needed to give maximum improvements in gain and feed conversion. Therefore, the results of any compound tested should cause responses similar to clenbuterol if the compound has half or more the activity of clenbuterol. The results are summarized in Table F and demonstrate that all nine compounds listed in Table A are capable of improving rate of gain and feed conversion and shifting carcass composition of growing animals from fat toward protein.

TABLE B

Comparative Activity of Inhibitors of Lipogenesis by Isolated Chicken Hepatocytes (Measured by $^{14}C$ acetate incorporation in fatty acids and expressed as percent change compared to control)

| COMPOUND | LEVEL μM | | | |
|---|---|---|---|---|
| | 0.01 | 0.05 | 0.25 | 1.25 |
| Test 1 | | | | |
| Isoproterenol | −29.1 | −48.6 | −70.3 | −74.4 |
| Clenbuterol | −4.2 | −16.4 | −24.6 | −24.7 |
| I | −45.2 | −61.3 | −66.0 | −63.3 |
| IV | −33.7 | −54.3 | −63.2 | −65.1 |
| IX | −50.5 | −67.2 | −72.3 | −72.6 |
| III | −9.5 | −35.5 | −54.4 | −62.4 |
| V | 0 | −34.0 | −64.6 | −68.8 |
| VI | 0 | 0 | −8.6 | −31.2 |
| II | 0 | 0 | −7.9 | −18.4 |
| Test 2 | | | | |
| Isoproterenol | −21 | −15 | −49 | −61 |
| Clenbuterol | −8 | −18 | −16 | 1 |
| IX | −30 | −56 | −63 | −64 |
| VIII | 26 | −9 | −34 | −63 |
| VI | 3 | −12 | −25 | −28 |

TABLE C

Comparative Activity of Stimulators of Lipolysis by Isolated Swine Adipocytes (Measured by glycerol production and expressed as percent increase compared to control)

| COMPOUND | LEVEL μM | | | |
|---|---|---|---|---|
| | 0.01 | 0.05 | 0.25 | 1.25 |
| Test 1 | | | | |
| Isoproterenol | 40 | 140 | 660 | 333 |
| Clenbuterol | 27 | −20 | −27 | −27 |
| I | 87 | 100 | 53 | 60 |
| IV | 260 | 333 | 80 | 53 |
| IX | 207 | 267 | 187 | 180 |
| VIII | 13 | 147 | 180 | 60 |
| V | 7 | 47 | 147 | 80 |
| III | 20 | 33 | 53 | 40 |
| VI | 20 | −7 | 0 | 140 |
| II | 27 | −7 | −40 | −27 |
| Test 2 | | | | |
| Isoproterenol | 175 | 196 | 820 | 800 |
| Clenbuterol | 0 | −20 | 4 | 17 |
| IX | 340 | 600 | 844 | 896 |
| VIII | 61 | 59 | 460 | 580 |
| VI | 8 | 21 | 3 | 160 |

TABLE D

Comparative Activity of Stimulators of Lipolysis by Isolated Ovine Adipocytes (Measured by glycerol production and expressed as percent increase compared to control)

| COMPOUND | LEVEL μM | | | |
|---|---|---|---|---|
| | 0.01 | 0.05 | 0.25 | 1.25 |
| Test 1 | | | | |
| Isoproterenol | 670 | 1510 | 1820 | 2080 |
| Clenbuterol | inactive | 240 | 325 | 305 |
| I | 730 | 960 | 1775 | 2400 |
| IV | 820 | 1160 | 1540 | 1645 |
| IX | 675 | 695 | 1525 | 2400 |
| III | 465 | 845 | 1775 | 2255 |
| VIII | 135 | 445 | 565 | 720 |
| V | inactive | 435 | 1170 | 2140 |
| VI | " | 130 | 465 | 2010 |
| II | " | inactive | 325 | 180 |
| Test 2 | | | | |
| Isoproterenol | 600 | 1614 | 1800 | 2157 |
| Clenbuterol | 186 | 857 | 1171 | 1914 |
| IX | 2014 | 2100 | 2043 | 2271 |
| VIII | 71 | 1143 | 1800 | 2143 |
| VI | −14 | 129 | 700 | 1800 |

TABLE E

Comparative Activity of Stimulators of Lipolysis by Rat Adipose Tissue (Measured by glycerol production and expressed as percent increase compared to control)

| COMPOUND | LEVEL μM | | | |
|---|---|---|---|---|
| | 0.01 | 0.05 | 0.25 | 1.25 |
| Test 1 | | | | |
| Isoproterenol | 45 | 173 | 290 | 272 |
| Clenbuterol | 12 | 26 | 21 | 15 |
| I | 90 | 129 | 281 | 334 |
| IV | 114 | 219 | 334 | 318 |
| IX | 42 | 91 | 258 | 322 |
| V | 17 | 33 | 111 | 288 |
| III | 194 | 203 | 334 | 288 |
| VI | 63 | 86 | 86 | 361 |
| II | 51 | 15 | 35 | 91 |
| VIII | 19 | 26 | 21 | 15 |
| Test 2 | | | | |
| Isoproterenol | 49 | 154 | 216 | 237 |
| Clenbuterol | 10 | 10 | 16 | 43 |
| IX | 16 | 70 | 145 | 222 |
| VI | 13 | 16 | 13 | 46 |
| VIII | −7 | 4 | 7 | 40 |

TABLE F

In vivo Testing in Rats

| Compound | Dose | Weight Gain g | g/day | Feed Intake g/day | Feed Conversion g/day | Carcass Composition % of Change over Control Fat | Protein |
|---|---|---|---|---|---|---|---|
| Test 1 | | | | | | | |
| Control | 0 | 191.8 | 7.3 | 18.6 | 2.55 | — | — |
| Clenbuterol | 10 | 198.6 | 7.8 | 19.2 | 2.48 | −11.3 | 11.2 |
| VII | 15.3 (a) | 200.9 | 8.0 | 19.8 | 2.48 | −8.7 | 3.6 |
| V | 38.5 (a) | 192.2 | 7.3 | 18.7 | 2.58 | −4.3 | 3.1 |
| III | 24.3 (a) | 201.7 | 8.0 | 19.4 | 2.41 | −7.0 | 6.1 |
| I | 26.4 (a) | 199.1 | 7.8 | 19.2 | 2.46 | −10.4 | 7.3 |
| IX | 21.8 (a) | 199.4 | 7.9 | 19.1 | 2.44 | −10.4 | 10.6 |
| VIII | 15.7 (a) | 202.6 | 8.1 | 19.5 | 2.41 | −6.1 | 6.4 |
| Test 2 | | | | | | | |
| Control | 0 | 202.3 | 7.5 | 19.3 | 2.63 | — | — |
| Clenbuterol | 10 | 216.9 | 8.2 | 19.9 | 2.46 | −11.9 | 4.3 |
| II | 19.0 (a) | 215.9 | 8.4 | 21.1 | 2.51 | −9.3 | 3.8 |
| VI | 27.0 (a) | 213.4 | 8.3 | 21.2 | 2.57 | 2.5 | 0.5 |
| IV | 23.0 (a) | 214.7 | 8.4 | 20.7 | 2.48 | −16.1 | 5.0 |

(a) Dose based on molecular weight equivalent of 20 ppm clenbuterol.

EXAMPLE 3

Compound V (bitolterol) was compared to clenbuterol for effects on growth, feed conversion and carcass composition of broilers raised in floor pens for 7 weeks. Bitolterol at 0.5, 1.0 and 2.0 ppm in the diet improved rate of gain, feed conversion and carcass protein in a dose-related manner. Bitolterol at the highest dose improved rate of gain 2.6% (P 0.01), feed conversion 3.8% (P 0.05) and carcass protein 4.9% (P 0.10). The latter responses were better than those observed with clenbuterol at 0.5 ppm. Bitolterol at these doses did not reduce carcass fat.

Clenbuterol at 0.5 ppm in the diet was administered for 7 weeks to one group and only during the last 4 weeks to another group. Administration of clenbuterol for 7 weeks was slightly more effective for improving feed conversion and carcass protein than clenbuterol for 4 weeks. Clenbuterol given for 7 weeks improved feed conversion 3.5% (P 0.05) and appeared to improve (not significant) rate of gain 0.4%, carcass weight 0.7% and carcass protein 4.0% and to decrease (not significant) carcass fat 7.1%.

DOSAGE UTILIZATION

The method of this invention is intended to increase the rate of body weight gain and/or feed efficiency and to decrease the carcass fat and increase the carcass protein of livestock such as cattle, sheep, poultry, pigs, etc. The compounds described herein in Table A can be administered in doses of from 0.01 to 100 ppm in feed or drinking water. In addition, they may be administered to ruminants as slow release rumen boluses at doses of 0.1 to 100 mg per head per day or to all livestock as parenteral formulations such as systemic implants providing doses of 0.001 to 10 mg per head per day. The boluses and subcutaneous implants typically are designed to provide for continuous administration of the active growth promoting compound for about 100 days.

What is claimed is:

1. A method for improving the growth of livestock which comprises administering to such livestock a sufficient amount of a compound having the formula:

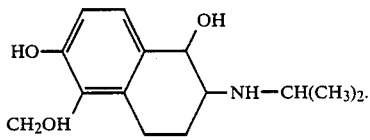

2. Animal feed compositions for administration to livestock which comprises 0.01 to 100 parts per million of a compound having the formula:

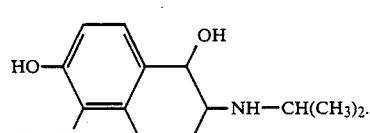

* * * * *